US012679984B2

(12) United States Patent
Makuta

(10) Patent No.: US 12,679,984 B2
(45) Date of Patent: Jul. 14, 2026

(54) ACTIVE ENERGY RAY-CURABLE INK, INK SET, AND IMAGE RECORDING METHOD

(71) Applicant: FUJIFILM CORPORATION, Tokyo (JP)

(72) Inventor: Toshiyuki Makuta, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 192 days.

(21) Appl. No.: 18/414,487

(22) Filed: Jan. 17, 2024

(65) Prior Publication Data

US 2024/0150596 A1 May 9, 2024

Related U.S. Application Data

(63) Continuation of application No. PCT/JP2022/019696, filed on May 9, 2022.

(30) Foreign Application Priority Data

Aug. 20, 2021 (JP) .................................. 2021-135103

(51) Int. Cl.
| | |
|---|---|
| *C09D 11/101* | (2014.01) |
| *B41J 2/01* | (2006.01) |
| *B41J 2/21* | (2006.01) |
| *B41J 11/00* | (2006.01) |
| *B41M 5/00* | (2006.01) |
| *C09D 11/104* | (2014.01) |
| *C09D 11/322* | (2014.01) |

(Continued)

(52) U.S. Cl.
CPC .............. *C09D 11/101* (2013.01); *B41J 2/01* (2013.01); *B41J 2/2107* (2013.01); *B41J 11/00214* (2021.01); *B41M 5/00* (2013.01); *C09D 11/104* (2013.01); *C09D 11/322* (2013.01); *C09D 11/40* (2013.01); *C09D 11/54* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | |
|---|---|---|
| 2009/0104367 A1 | 4/2009 | Simon |
| 2010/0249261 A1 | 9/2010 | Yokoi |
| 2011/0293898 A1 | 12/2011 | Yatake et al. |

(Continued)

FOREIGN PATENT DOCUMENTS

| | | |
|---|---|---|
| CN | 102261001 A | 11/2011 |
| CN | 104512141 A | 4/2015 |

(Continued)

OTHER PUBLICATIONS

Gelest Bimax Poea; 2-Phenoxyethyl Acrylate; CAS No. 48145-04-6 (Year: 2023).*

(Continued)

*Primary Examiner* — Manish S Shah
(74) *Attorney, Agent, or Firm* — SOLARIS Intellectual Property Group, PLLC

(57) ABSTRACT

An active energy ray-curable ink including a polymerizable compound and a colorant, the polymerizable compound including an N-vinyl compound, a monofunctional polymerizable compound capable of forming a homopolymer having a Tg of −30° C. to 30° C., and a compound selected from the group consisting of a difunctional (meth)acrylate and a polymerizable silicone-based surfactant, wherein the total content of a monofunctional polymerizable compound capable of forming a homopolymer having a Tg of less than −30° C. and a monofunctional polymerizable compound capable of forming a homopolymer having a Tg of more than 30° C. excluding the N-vinyl compound is 10% by mass or less of the total amount of the polymerizable compound, and the total content of the compound selected from the group consisting of the difunctional (meth)acrylate and the polymerizable silicone-based surfactant is 0.1% to 2% by mass of the total amount of the polymerizable compound, and applications of the active energy ray-curable ink.

15 Claims, No Drawings

(51) Int. Cl.
 C09D 11/40 (2014.01)
 C09D 11/54 (2014.01)

(56) References Cited

U.S. PATENT DOCUMENTS

| | | | |
|---|---|---|---|
| 2012/0287213 A1* | 11/2012 | Engel | C09D 11/322 |
| | | | 522/182 |
| 2013/0295342 A1* | 11/2013 | Araki | C09D 11/30 |
| | | | 522/167 |
| 2015/0064398 A1 | 3/2015 | Umebayashi | |
| 2015/0091217 A1 | 4/2015 | Araki | |
| 2015/0344709 A1* | 12/2015 | Araki | C09D 11/40 |
| | | | 522/167 |
| 2015/0368493 A1 | 12/2015 | Yamada | |
| 2016/0326387 A1* | 11/2016 | Arita | C09D 11/30 |
| 2019/0153249 A1* | 5/2019 | Yang | C09D 11/38 |
| 2020/0369904 A1 | 11/2020 | Fujii et al. | |
| 2021/0301162 A1* | 9/2021 | Nakamura | C09D 11/38 |
| 2021/0403742 A1* | 12/2021 | Takahashi | C09D 11/107 |
| 2022/0064467 A1* | 3/2022 | Tanaka | B41J 2/2114 |

FOREIGN PATENT DOCUMENTS

| | | | |
|---|---|---|---|
| CN | 111727226 A | 9/2020 | |
| EP | 2484729 A1 | 8/2012 | |
| EP | 2949710 A1 | 12/2015 | |
| JP | 2009-84313 A | 4/2009 | |
| JP | 2010-235697 A | 10/2010 | |
| JP | 2013-180529 A | 9/2013 | |
| JP | 2014-136795 A | 7/2014 | |
| JP | 2015-47748 A | 3/2015 | |
| JP | 6021777 B2 | 11/2016 | |
| JP | 6231747 B2 | 11/2017 | |

OTHER PUBLICATIONS

Extended European Search Report dated Nov. 15, 2024, issued in corresponding EP Patent Application No. 22858117.9.

International Search Report issued in International Application No. PCT/JP2022/019696 on Jul. 26, 2022.

Written Opinion of the ISA issued in International Application No. PCT/JP2022/019696 on Jul. 26, 2022.

English language translation of the following: Notice dated Jul. 12, 2025 from the SIPO in a Chinese patent application No. 202280054661.5 corresponding to the instant patent application. This office action translation is submitted now in order to supplement the understanding of the cited references which are being disclosed in the instant Information Disclosure Statement.

English language translation of the following: Office action dated Oct. 7, 2025 from the JPO in aapplication No. 2023-542222 corresponding to the instant patent application. This office action translation is submitted now in order to supplement the understanding of the cited reference which is being disclosed in the instant Information Disclosure Statement.

* cited by examiner

ACTIVE ENERGY RAY-CURABLE INK, INK SET, AND IMAGE RECORDING METHOD

CROSS-REFERENCE TO RELATED APPLICATIONS

This application is a continuation of International Application No. PCT/JP2022/019696, filed May 9, 2022, which claims priority to Japanese Patent Application No. 2021-135103, filed Aug. 20, 2021. Each of the above applications is hereby expressly incorporated by reference, in its entirety, into the present application.

BACKGROUND OF THE INVENTION

1. Field of the Invention

The present disclosure relates to an active energy ray-curable ink, an ink set, and an image recording method.

2. Description of the Related Art

Methods of recording images on a substrate with an ink by curing the ink using an active energy ray have been known. For example, in JP2015-47748A, an ink that includes N-vinylcaprolactam, a monofunctional acrylate having an aromatic ring, a monofunctional acrylate having an aliphatic hydrocarbon ring, a polysiloxane compound, an acrylic resin having a glass transition temperature of 40° C. to 90° C., a photopolymerization initiator, and a pigment, wherein the content of the acrylic resin is 0.5% by mass or more and 5% by mass or less, is described. In JP2009-84313A, an active ray-curable ink composition that includes a monofunctional ethylenic unsaturated compound having only one ethylenic unsaturated bond in the molecule and a photopolymerization initiator having a molecular weight of 1,000 or less and not having an ethylenic unsaturated bond in the molecule, wherein the contents of the monofunctional ethylenic unsaturated compound and the photopolymerization initiator in the ink composition are 65% by weight or more and 7.5% by weight or less, respectively, is described.

SUMMARY OF THE INVENTION

An image recorded article can be produced by recording an image on a substrate with an ink. In the case where the substrate is flexible, the image recorded article becomes deformed as a result of folding, bending or the like. Thus, it is required that the image be maintained even when the image recorded article is deformed. It may be also required to reduce the stickiness of the image in order to increase ease of handling of the image recorded article.

The present disclosure was made in light of the above circumstances. According to an exemplary embodiment of the present invention, an active energy ray-curable ink, an ink set, and an image recording method with which images excellent in terms of flexibility and blocking resistance can be recorded may be provided.

The present disclosure includes the following aspects.

<1> An active energy ray-curable ink including:
a polymerizable compound; and
a colorant,
the polymerizable compound including
an N-vinyl compound,
a monofunctional polymerizable compound capable of forming a homopolymer having a glass transition temperature of –30° C. to 30° C., and a compound selected from the group consisting of a difunctional (meth)acrylate and a polymerizable silicone-based surfactant,
wherein a total content of a monofunctional polymerizable compound capable of forming a homopolymer having a glass transition temperature of less than –30° C. and a monofunctional polymerizable compound capable of forming a homopolymer having a glass transition temperature of more than 30° C. excluding the N-vinyl compound is 10% by mass or less of a total amount of the polymerizable compound, and
a total content of the compound selected from the group consisting of the difunctional (meth)acrylate and the polymerizable silicone-based surfactant is 0.1% to 2% by mass of the total amount of the polymerizable compound.

<2> The active energy ray-curable ink according to <1>,
wherein a content of the N-vinyl compound is 10% to 35% by mass of the total amount of the polymerizable compound, and
a content of the monofunctional polymerizable compound capable of forming a homopolymer having a glass transition temperature of –30° C. to 30° C. is 60% to 85% by mass of the total amount of the polymerizable compound.

<3> The active energy ray-curable ink according to <1> or <2>,
wherein the N-vinyl compound includes N-vinylcaprolactam.

<4> The active energy ray-curable ink according to any one of <1> to <3>,
wherein the monofunctional polymerizable compound capable of forming a homopolymer having a glass transition temperature of –30° C. to 30° C. includes phenoxyethyl acrylate.

<5> The active energy ray-curable ink according to any one of <1> to <4>,
wherein the number of carbon atoms included in the difunctional (meth)acrylate excluding a (meth)acryloyl group-portion is 4 to 36.

<6> The active energy ray-curable ink according to any one of <1> to <5>,
wherein the polymerizable compound includes the polymerizable silicone-based surfactant.

<7> An ink set including:
the active energy ray-curable ink according to any one of <1> to <6>; and
a pretreatment liquid.

<8> The ink set according to <7>,
wherein the pretreatment liquid includes a polymerizable compound and a polyester resin.

<9> The ink set according to <7>,
wherein the pretreatment liquid includes a polymerizable compound including a polymerizable compound A having an acid group.

<10> The ink set according to <8> or <9>,
wherein a proportion of a monofunctional polymerizable compound to the polymerizable compound included in the pretreatment liquid is 80% by mass or more.

<11> An image recording method including:
applying the active energy ray-curable ink according to any one of <1> to <6> to a substrate; and
irradiating the active energy ray-curable ink deposited on the substrate with an active energy ray.

<12> The image recording method according to <11>,
wherein the substrate has a thickness of 1 mm or more.

<13> The image recording method according to <11> or
<12>, wherein the substrate is composed of a metal, a plastic,
synthetic leather, or a rubber.

<14> An image recording method including:

using the ink set according to any one of <7> to <10>;

applying the pretreatment liquid and the ink to a substrate
by ink jet recording; and performing irradiation with an active energy ray subse-
quent to application of the pretreatment liquid and
subsequent to application of the ink.

According to an exemplary embodiment of the present
invention, an active energy ray-curable ink, an ink set, and
an image recording method with which images excellent in
terms of flexibility and blocking resistance can be recorded
may be provided.

DESCRIPTION OF THE PREFERRED
EMBODIMENTS

Details of the active energy ray-curable ink, ink set, and
image recording method according to the present disclosure
are described below.

In the present specification, a numerical range expressed
using "to" means the range that includes the values
described before and after "to" as the minimum and maxi-
mum values, respectively.

In the present specification, when numerical ranges are
described in a stepwise manner, the upper or lower limit of
a numerical range may be replaced with the upper or lower
limit of another numerical range, respectively. In the present
specification, when a numerical range is described, the upper
or lower limit of the numerical range may be replaced with
a value described in Examples below.

In the present specification, in the case where a compo-
sition includes a plurality of substances that correspond to a
component of the composition, the content of the component
in the composition is the total content of the substances in
the composition unless otherwise specified.

In the present specification, a combination of two or more
preferable aspects is a more preferable aspect.

In the present specification, the term "step" refers not only
to an individual step but also to a step that is not distin-
guishable from other steps but achieves the intended purpose
of the step.

In the present specification, the term "image" refers
generally to a film formed by application of an ink. The term
"image recording" refers to the formation of an image, that
is, the film.

In the present specification, the concept of the term
"image" includes a solid image.

In the present specification, the concept of the term
"(meth)acrylate" includes both acrylate and methacrylate.
The concept of the term "(meth)acryl" includes both acryl
and methacryl.

Ink

The active energy ray-curable ink jet ink according to an
exemplary embodiment of the present disclosure (hereinaf-
ter, also referred to simply as "ink") includes a polymeriz-
able compound and a colorant. The polymerizable com-
pound includes an N-vinyl compound, a monofunctional
polymerizable compound capable of forming a homopoly-
mer having a glass transition temperature (hereinafter, also
referred to as "Tg") of −30° C. to 30° C. (hereinafter, the
glass transition temperature of a homopolymer of the mono-
functional polymerizable compound may be referred to
simply as "Tg of the monofunctional polymerizable compound"), and a compound selected from the group consist-
ing of a difunctional (meth)acrylate and a polymerizable
silicone-based surfactant. In the ink, the total content of a
monofunctional polymerizable compound capable of form-
ing a homopolymer having a glass transition temperature of
less than −30° C. and a monofunctional polymerizable
compound capable of forming a homopolymer having a
glass transition temperature of more than 30° C. excluding
the N-vinyl compound is 10% by mass or less of the total
amount of the polymerizable compound. In the ink, the total
content of the compound selected from the group consisting
of the difunctional (meth)acrylate and the polymerizable
silicone-based surfactant is 0.1% to 2% by mass of the total
amount of the polymerizable compound.

For example, when the ink according to an exemplary
embodiment of the present disclosure is applied to a sub-
strate and subsequently irradiated with an active energy ray,
an image recorded article that includes the substrate and an
ink film formed thereon, which is an image, can be pro-
duced. Since the ink according to an exemplary embodiment
of the present disclosure includes a polymerizable com-
pound, a polymerization reaction occurs when the ink is
irradiated with an active energy ray.

An N-vinyl compound is highly capable of capturing
oxygen atoms, which inhibit polymerization. Thus, in the
case where the ink includes an N-vinyl compound, surface
curability is enhanced and, consequently, the stickiness of
the image may be reduced. In the case where the ink includes
a monofunctional polymerizable compound having a Tg of
−30° C. to 30° C., the ink film formed as a result of a curing
reaction may have excellent flexibility. That is, an image
having excellent flexibility may be produced. Since having
an amide bond, an N-vinyl compound is likely to have a high
Tg. Adding a monofunctional polymerizable compound
having a Tg of −30° C. to 30° C. to the ink in addition to the
N-vinyl compound enables intended blocking resistance and
intended flexibility to be both achieved. Furthermore, excel-
lent adhesiveness may also be achieved.

In the case where the ink further includes a compound
selected from the group consisting of a difunctional (meth)
acrylate and a polymerizable silicone-based surfactant, the
stickiness of the image may be reduced and the blocking
resistance of the image may be enhanced. In the case where
the ink includes a difunctional (meth)acrylate, a crosslinking
reaction may occur inside the ink film. This makes the ink
film strong and hard and consequently reduces the stickiness
of the image. In the case where the ink includes a polym-
erizable silicone-based surfactant, the polymerizable sili-
cone-based surfactant rises to the surface of the ink and,
consequently, the curability of the surface of the ink film is
enhanced. Therefore, the stickiness of the image may be
reduced and excellent blocking resistance may be achieved
accordingly. In addition, adhesiveness may be enhanced.

In particular, when the total content of the compound
selected from the group consisting of a difunctional (meth)
acrylate and a polymerizable silicone-based surfactant is
0.1% by mass or more of the total amount of the polymer-
izable compound, the intended blocking resistance may be
achieved. When the above total content is 2% by mass or
less, excellent flexibility may be achieved.

The total content of a monofunctional polymerizable
compound capable of forming a homopolymer having a
glass transition temperature of less than −30° C. and a
monofunctional polymerizable compound capable of form-
ing a homopolymer having a glass transition temperature of
more than 30° C. (excluding the N-vinyl compound) is 10%
by mass or less of the total amount of the polymerizable compound. This means that the above monofunctional polymerizable compounds are not principal components of the polymerizable compound. When the above total content is 10% by mass or less, the image may have excellent flexibility.

On the other hand, the ink described in JP2015-47748A includes a monofunctional polymerizable compound capable of forming a homopolymer having a glass transition temperature of more than 30° C. as a principal component. That is, it is considered that JP2015-47748A and the present application are based on different technical ideas. Furthermore, the ink described in JP2009-84313A does not include a compound selected from the group consisting of a difunctional (meth)acrylate and a polymerizable silicone-based surfactant. That is, it is considered that JP2009-84313A and the present application are based on different technical ideas.

Each of the components of the ink according to an exemplary embodiment of the present disclosure is described below.

The ink according to an exemplary embodiment of the present disclosure is an active energy ray-curable ink. That is, the ink according to an exemplary embodiment of the present disclosure becomes cured when irradiated with an active energy ray. Examples of the active energy ray include a γ-ray, a β-ray, an electron beam, ultraviolet radiation, and visible light. Among these, ultraviolet radiation is preferably used as an active energy ray. The ink according to an exemplary embodiment of the present disclosure is preferably an ultraviolet curable ink.

Polymerizable Compound

The ink according to an exemplary embodiment of the present disclosure includes a polymerizable compound. The ink may include only one type of a polymerizable compound or two or more types of polymerizable compounds.

The polymerizable group included in the polymerizable compound may be a cationic polymerizable group or a radical polymerizable group and is preferably a radical polymerizable group in consideration of curability. The radical polymerizable group is preferably an ethylenic unsaturated group in consideration of curability.

The polymerizable compound may be a monofunctional polymerizable compound having one polymerizable group or a multifunctional polymerizable compound having two or more polymerizable groups.

In the ink according to an exemplary embodiment of the present disclosure, the polymerizable compound includes an N-vinyl compound, a monofunctional polymerizable compound capable of forming a homopolymer having a glass transition temperature (Tg) of −30° C. to 30° C., and a compound selected from the group consisting of a difunctional (meth)acrylate and a polymerizable silicone-based surfactant.

Since an N-vinyl compound is highly capable of capturing oxygen atoms, which inhibit polymerization, in the case where the ink includes an N-vinyl compound, surface curability is enhanced and, consequently, the stickiness of the image may be reduced. In the case where the ink includes a monofunctional polymerizable compound having a Tg of −30° C. to 30° C., the ink film formed as a result of a curing reaction may have excellent flexibility. That is, an image having excellent flexibility may be produced. Since having an amide bond, an N-vinyl compound is likely to have a high Tg. Adding a monofunctional polymerizable compound having a Tg of −30° C. to 30° C. to the ink in addition to the N-vinyl compound enables intended blocking resistance and intended flexibility to be both achieved.

In the case where the ink further includes a compound selected from the group consisting of a difunctional (meth) acrylate and a polymerizable silicone-based surfactant, the stickiness of the image may be reduced. In the case where the ink includes a difunctional (meth)acrylate, a crosslinking reaction may occur inside the ink film. This makes the ink film strong and hard and consequently reduces the stickiness of the image. In the case where the ink includes a polymerizable silicone-based surfactant, the polymerizable silicone-based surfactant rises to the surface of the ink and, consequently, the curability of the surface of the ink film is enhanced. Therefore, the stickiness of the image may be reduced.

The content of the polymerizable compound is preferably 70% to 95% by mass and is more preferably 75% to 90% by mass of the total amount of the ink in consideration of curability.

N-Vinyl Compound

Examples of the N-vinyl compound include N-vinylpyrrolidone, N-vinylcaprolactam, N-vinylformamide, and N-vinylphthalimide. Among these, N-vinylcaprolactam is preferably used as an N-vinyl compound in order to further enhance surface curability.

In order to further enhance flexibility and blocking resistance, the content of the N-vinyl compound is preferably 10% to 35% by mass of the total amount of the polymerizable compound, and the content of the monofunctional polymerizable compound capable of forming a homopolymer having a glass transition temperature of −30° C. to 30° C. is preferably 60% to 85% by mass of the total amount of the polymerizable compound.

In order to still further enhance flexibility and blocking resistance, the content of the N-vinyl compound is more preferably 15% to 30% by mass of the total amount of the polymerizable compound, and the content of the monofunctional polymerizable compound capable of forming a homopolymer having a glass transition temperature of −30° C. to 30° C. is more preferably 65% to 80% by mass of the total amount of the polymerizable compound.

Monofunctional Polymerizable Compound Capable of Forming Homopolymer Having Tg of −30° C. to 30° C.

A monofunctional polymerizable compound is a compound having one polymerizable group. In consideration of curability, the monofunctional polymerizable compound is preferably a monofunctional radical-polymerizable compound and is more preferably a monofunctional ethylenic unsaturated compound.

Examples of the monofunctional ethylenic unsaturated compound include a monofunctional (meth)acrylate, a monofunctional (meth)acrylamide, a monofunctional aromatic vinyl compound, and a monofunctional vinyl ether.

Examples of the monofunctional polymerizable compound capable of forming a homopolymer having a Tg of −30° C. to 30° C. include the following specific examples of the monofunctional polymerizable compound which are capable of forming a homopolymer having a Tg of −30° C. to 30° C.

Examples of the monofunctional (meth)acrylate include methyl (meth)acrylate, ethyl (meth)acrylate, propyl (meth) acrylate, n-butyl (meth)acrylate, hexyl (meth)acrylate, 2-ethylhexyl (meth)acrylate, tert-octyl (meth)acrylate, isoamyl (meth)acrylate, decyl (meth)acrylate, isodecyl (meth) acrylate, lauryl (meth)acrylate, stearyl (meth)acrylate, isostearyl (meth)acrylate, cyclohexyl (meth)acrylate, 4-n-butylcyclohexyl (meth)acrylate, 4-tert-butylcyclohexyl (meth)acrylate, bornyl (meth)acrylate, isobornyl (meth) acrylate, 2-ethylhexyl diglycol (meth)acrylate, butoxyethyl (meth)acrylate, 2-chloroethyl (meth)acrylate, 4-bromobutyl (meth)acrylate, cyanoethyl (meth)acrylate, benzyl (meth) acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, 2,2,2-tetrafluoro-ethyl (meth)acrylate, 1H,1H,2H,2H-perfluorodecyl (meth) acrylate, 4-butylphenyl (meth)acrylate, phenyl (meth)acrylate, 2,4,5-tetramethylphenyl (meth)acrylate, 4-chlorophenyl (meth)acrylate, 2-phenoxymethyl (meth) acrylate, 2-phenoxyethyl (meth)acrylate, glycidyl (meth) acrylate, glycidyloxybutyl (meth)acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth)acrylate, 2-hydroxypropyl (meth) acrylate, 2-hydroxybutyl (meth)acrylate, 3-hydroxybutyl (meth)acrylate, 4-hydroxybutyl (meth)acrylate, cyclic trimethylolpropane formal (meth)acrylate, phenyl glycidyl ether (meth)acrylate, dimethylaminoethyl (meth)acrylate, diethylaminoethyl (meth)acrylate, dimethylaminopropyl (meth) acrylate, diethylaminopropyl (meth)acrylate, trimethoxysilylpropyl (meth)acrylate, trimethylsilylpropyl (meth) acrylate, polyethylene oxide monomethyl ether (meth) acrylate, polyethylene oxide (meth)acrylate, polyethylene oxide monoalkyl ether (meth)acrylate, dipropylene glycol (meth)acrylate, polypropylene oxide monoalkyl ether (meth)acrylate, 2-methacryloyloxyethylsuccinic acid, 2-methacryloyloxyhexahydrophthalic acid, 2-methacryloyloxyethyl-2-hydroxypropyl phthalate, ethoxydiethylene glycol (meth)acrylate, butoxydiethylene glycol (meth)acrylate, trifluoroethyl (meth)acrylate, perfluorooctylethyl (meth) acrylate, 2-hydroxy-3-phenoxypropyl (meth)acrylate, ethylene oxide (EO)-modified phenol (meth)acrylate, EO-modified cresol (meth)acrylate, EO-modified nonylphenol (meth) acrylate, propylene oxide (PO) modified nonylphenol (meth) acrylate, EO-modified-2-ethylhexyl (meth)acrylate, dicyclopentenyl (meth)acrylate, dicyclopentenyloxyethyl (meth)acrylate, dicyclopentanyl (meth)acrylate, (3-ethyl-3-oxetanylmethyl) (meth)acrylate, phenoxyethylene glycol (meth)acrylate, 2-carboxyethyl (meth)acrylate, and 2-(meth) acryloyloxyethyl succinate.

Examples of the monofunctional (meth)acrylamide include (meth)acrylamide, N-methyl(meth)acrylamide, N-ethyl(meth)acrylamide, N-propyl(meth)acrylamide, N-n-butyl(meth)acrylamide, N-t-butyl(meth)acrylamide, N-butoxymethyl(meth)acrylamide, N-isopropyl(meth)acrylamide, N-methylol(meth)acrylamide, N,N-dimethyl(meth)acrylamide, N,N-diethyl(meth)acrylamide, and (meth) acryloylmorpholine.

Examples of the monofunctional aromatic vinyl compound include styrene, dimethylstyrene, trimethylstyrene, isopropylstyrene, chloromethylstyrene, methoxystyrene, acetoxystyrene, chlorostyrene, dichlorostyrene, bromostyrene, vinyl benzoic acid methyl ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, and 4-t-butoxystyrene.

Examples of the monofunctional vinyl ether include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

The glass transition temperature of a homopolymer formed of the monofunctional polymerizable compound can be measured by the following method. First, a homopolymer having a weight-average molecular weight of 10,000 to 20,000 is produced using the monofunctional polymerizable compound. The glass transition temperature of the homopolymer is measured in conformity with the method described in JIS K 7121:2012. Specifically, the glass transition temperature is measured using a differential scanning calorimeter, such as "DSC-60" produced by Shimadzu Corporation. The above weight-average molecular weight is measured using gel permeation chromatography (GPC). For example, "HLC-8220GPC" produced by Tosoh Corporation is used for GPC, three "TSKgel SuperMultipore HZ-H" columns produced by Tosoh Corporation (4.6 mmID×15 cm) are used as columns, and tetrahydrofuran (THF) is used as an eluant. As for measurement conditions, the sample concentration is set to 0.45% by mass, the flow rate is set to 0.35 ml/min, the sample injection volume is set to 10 µl, and the measurement temperature is set to 40° C. A refractive index (RI) detector is used for detection. Calibration curves are prepared using the eight samples as reference samples: "TSK standard polystyrene F-40", "F-20", "F-4", "F-1", "A-5000", "A-2500", and "A-1000" and "n-propylbenzene" produced by Tosoh Corporation. While the glass transition temperature of the homopolymer varies by the weight-average molecular weight of the homopolymer, the variations are negligibly small when the weight-average molecular weight is 10,000 to 20,000.

The molecular weight of the monofunctional polymerizable compound capable of forming a homopolymer having a Tg of −30° C. to 30° C. is preferably 1,000 or less and is more preferably 500 or less. When the above molecular weight is 1,000 or less, an image having further high flexibility and further high blocking resistance may be recorded.

The monofunctional polymerizable compound capable of forming a homopolymer having a Tg of −30° C. to 30° C. is preferably a monofunctional acrylate in consideration of curability. Examples of the monofunctional acrylate capable of forming a homopolymer having a Tg of −30° C. to 30° C. include benzyl acrylate (6° C.), cyclohexyl acrylate (15° C.), 2-methyl-2-ethyl-1,3-dioxolan-4-yl)methyl acrylate (−7° C.), tetrahydrofurfuryl acrylate (−15° C.), lauryl acrylate (−30° C.), 3,3,5-trimethylcyclohexyl acrylate (−29° C.), phenoxyethyl acrylate (5° C.), and 2-acryloyloxyethylsuccinic acid (17° C.), where the temperatures in the parentheses are the Tg's of homopolymers of the respective monofunctional acrylates.

The monofunctional polymerizable compound capable of forming a homopolymer having a Tg of −30° C. to 30° C. is particularly preferably phenoxyethyl acrylate in order to further enhance the flexibility of the image.

Compound Selected from Group Consisting of Difunctional (Meth)acrylate and Polymerizable Silicone-Based Surfactant The ink according to an exemplary embodiment of the present disclosure includes a compound selected from the group consisting of a difunctional (meth)acrylate and a polymerizable silicone-based surfactant. The ink may include only the difunctional (meth)acrylate, only the polymerizable silicone-based surfactant, or both difunctional (meth)acrylate and polymerizable silicone-based surfactant. The blocking resistance of the image may be enhanced in either case. It is particularly preferable that the ink include the polymerizable silicone-based surfactant in order to further enhance blocking resistance.

Difunctional (Meth)acrylate

The difunctional (meth)acrylate is a compound having two (meth)acryloyl groups. The difunctional (meth)acrylate may be any of a compound having two acryloyl groups, a compound having two methacryloyl groups, and a compound having an acryloyl group and a methacryloyl group. In the present disclosure, it is considered that the difunctional (meth)acrylate does not include a silicone structure. Thus, in the present disclosure, the difunctional (meth) acrylate is distinguished from the polymerizable silicone-based surfactant. Thus, a silicone-based surfactant having two acryloyl groups is considered as a polymerizable silicone-based surfactant.

Examples of the difunctional (meth)acrylate include ethylene glycol di(meth)acrylate, diethylene glycol di(meth) acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, butylene glycol di(meth)acrylate, tetraethylene glycol di(meth)acrylate, neopentyl glycol di(meth)acrylate, 3-methyl-1,5-pentanediol di(meth)acrylate, hexanediol di(meth)acrylate, heptanediol di(meth)acrylate, EO-modified neopentyl glycol di(meth)acrylate, PO-modified neopentyl glycol di(meth)acrylate, EO-modified hexanediol di(meth)acrylate, PO-modified hexanediol di(meth)acrylate, octanediol di(meth)acrylate, nonanediol di(meth)acrylate, decanediol di(meth)acrylate, dodecanediol di(meth)acrylate, 1,6-hexanediol di(meth)acrylate, glycerin di(meth)acrylate, pentaerythritol di(meth)acrylate, ethylene glycol diglycidyl ether di(meth)acrylate, diethylene glycol diglycidyl ether di(meth)acrylate, and tricyclodecanedimethanol di(meth) acrylate.

The number of carbon atoms included in the difunctional (meth)acrylate excluding the (meth)acryloyl group-portion is preferably 4 to 36 and is more preferably 5 to 15. When the number of the above carbon atoms is 4 or more, the flexibility of the image may be enhanced. When the number of the above carbon atoms is 36 or less, an increase in the viscosity of the ink is limited and the blocking resistance of the image may be enhanced.

Polymerizable Silicone-Based Surfactant

In the present disclosure, the term "polymerizable silicone-based surfactant" refers to a silicone-based surfactant having a polymerizable group.

The polymerizable group included in the polymerizable silicone-based surfactant may be a cationic polymerizable group or a radical polymerizable group. In consideration of curability, the above polymerizable group is preferably a radical polymerizable group. The radical polymerizable group is preferably an ethylenic unsaturated group in consideration of curability. In particular, the polymerizable group included in the polymerizable surfactant is preferably a vinyl group or a (meth)acryloyl group. The polymerizable group is more preferably a (meth)acryloyl group in consideration of curability.

The number of the polymerizable groups included in the polymerizable surfactant is preferably two or more in consideration of blocking resistance. The upper limit for the number of the polymerizable groups included in the polymerizable surfactant is, for example, but not limited to, five in consideration of discharge performance with which the ink is ejected by ink jet recording.

That is, as for the types and number of the polymerizable groups, the polymerizable silicone-based surfactant is preferably a silicone-based surfactant having two or more (meth) acryloyl groups.

Examples of the polymerizable silicone-based surfactant include a compound formed as a result of the above polymerizable groups being bonded to the backbone or side chain of polyether-modified dimethylsiloxane.

Examples of commercial products of the polymerizable silicone-based surfactant include silicone-based surfactants having a (meth)acryloyl group, such as BYK-UV3500, 3505, 3530, 3570, 3575, and 3576 produced by BYK, Tegorad 2100, 2200, 2250, 2300, 2500, 2600, 2700, 2800, 2010, and 2011 produced by Evonik Industries AG, EBE-CRYL 350 and 1360 produced by Daicel-Allnex Ltd., and KP-410, 411, 412, 413, 414, 415, 416, 418, 420, 422, and 423 produced by Shin-Etsu Chemical Co., Ltd.

The total content of the compound selected from the group consisting of the difunctional (meth)acrylate and the polymerizable silicone-based surfactant in the ink is 0.1% to 2% by mass, is preferably 0.5% to 1.8% by mass, and is further preferably 1.0% to 1.5% by mass of the total amount of the polymerizable compound. When the above total content is 0.1% by mass or more, an image having excellent blocking resistance may be produced. When the above total content is 2% by mass or less, an image having excellent flexibility may be produced.

Other Polymerizable Compound

The ink according to an exemplary embodiment of the present disclosure may include a polymerizable compound other than the N-vinyl compound, the monofunctional polymerizable compound capable of forming a homopolymer having a Tg of −30° C. to 30° C., or the compound selected from the group consisting of a difunctional (meth) acrylate and a polymerizable silicone-based surfactant.

Examples of the other polymerizable compound include a monofunctional polymerizable compound capable of forming a homopolymer having a glass transition temperature (Tg) of less than −30° C. and a monofunctional polymerizable compound capable of forming a homopolymer having a glass transition temperature (Tg) of more than 30° C. The method for measuring Tg is as described above.

Examples of the monofunctional polymerizable compound capable of forming a homopolymer having a glass transition temperature of less than −30° C. and the monofunctional polymerizable compound capable of forming a homopolymer having a glass transition temperature of more than 30° C. include the monofunctional polymerizable compounds which are described above as specific examples of the monofunctional polymerizable compound and which have a Tg of less than −30° C. or more than 30° C.

The total content of the monofunctional polymerizable compound capable of forming a homopolymer having a glass transition temperature of less than −30° C. and the monofunctional polymerizable compound capable of forming a homopolymer having a glass transition temperature of more than 30° C. (excluding the content of the N-vinyl compound) is 10% by mass or less and is preferably 5% by mass or less of the total amount of the polymerizable compound. The lower limit for the above total content is, for example, but not limited to, 0% by mass. When the above total content is 10% by mass or less, an image having excellent flexibility may be formed.

Examples of the other polymerizable compound also include a multifunctional polymerizable compound other than the difunctional (meth)acrylate.

The multifunctional polymerizable compound is not limited and may be any compound having two or more polymerizable groups. The multifunctional polymerizable compound is preferably a multifunctional radical-polymerizable compound and is more preferably a multifunctional ethylenic unsaturated compound in consideration of curability.

Examples of the multifunctional ethylenic unsaturated compound other than the difunctional (meth)acrylate include (meth)acrylates having three or more functional groups and multifunctional vinyl ethers having two or more functional groups.

Examples of the (meth)acrylates having three or more functional groups include trimethylolethane tri(meth)acrylate, trimethylolpropane tri(meth)acrylate, trimethylolpropane EO-adduct tri(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, tri(meth)acryloyloxyethoxytrimethylolpropane, glycerin polyglycidyl ether poly(meth)acrylate, and tris(2-acryloyloxyethyl) isocyanurate.

Examples of the multifunctional vinyl ethers include 1,4-butanediol divinyl ether, ethylene glycol divinyl ether, diethylene glycol divinyl ether, triethylene glycol divinyl ether, polyethylene glycol divinyl ether, propylene glycol divinyl ether, butylene glycol divinyl ether, hexanediol divinyl ether, 1,4-cyclohexanedimethanol divinyl ether, bisphenol A alkylene oxide divinyl ether, bisphenol F alkylene oxide divinyl ether, trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, EO-adduct trimethylolpropane trivinyl ether, PO-adduct trimethylolpropane trivinyl ether, EO-adduct ditrimethylolpropane tetravinyl ether, PO-adduct ditrimethylolpropane tetravinyl ether, EO-adduct pentaerythritol tetravinyl ether, PO-adduct pentaerythritol tetravinyl ether, EO-adduct dipentaerythritol hexavinyl ether, and PO-adduct dipentaerythritol hexavinyl ether.

The total content of the above multifunctional polymerizable compounds other than the difunctional acrylate is preferably 10% by mass or less and is more preferably 5% by mass or less of the total amount of the polymerizable compound. The lower limit for the total content is not set and is, for example, 0% by mass. When the above total content is 10% by mass or less, the flexibility of the image may be enhanced.

Colorant

The ink according to an exemplary embodiment of the present disclosure includes a colorant. The ink may include only one type of a colorant or two or more types of inks.

Examples of the colorant include a dye and a pigment. The colorant is preferably a pigment in consideration of durability properties, such as heat resistance, light resistance, and water resistance.

In the case where a pigment is used as a colorant, the pigment may be added to the ink in the form of a pigment dispersion liquid. The pigment dispersion liquid is a liquid produced by dispersing a pigment in a liquid medium using a dispersing agent and includes at least a pigment, a dispersing agent, and a liquid medium. Details of the dispersing agent are described below. The liquid medium may be an organic solvent or a polymerizable compound.

Both organic and inorganic pigments that are commonly commercially available may be used as a pigment. Examples of the pigment include the pigments described in "Encyclopedia of Pigments" edited by Seishiro Ito, published in 2000, "Industrial Organic Pigments" by W. Herbst, K. Hunger, JP2002-12607A, JP2002-188025A, JP2003-26978A, and JP2003-342503A.

The content of the colorant is preferably 0.5% to 15% by mass and is more preferably 1% to 10% by mass of the total amount of the ink.

Dispersing Agent

In the case where a pigment is used as a colorant, the pigment can be added to the ink in the form of a pigment dispersion liquid. The pigment can be dispersed in a liquid medium using a dispersing agent. Publicly known dispersing agents may be used. The dispersing agent is preferably a compound having both hydrophilic and hydrophobic structures in consideration of dispersion stability.

Examples of the dispersing agent include low-molecular-weight dispersing agents having a molecular weight of less than 1,000, such as a higher fatty acid salt, an alkyl sulfate, an alkyl ester sulfate, an alkyl sulfonic acid salt, a sulfosuccinic acid salt, a naphthalenesulfonic acid salt, an alkyl phosphate, a polyoxyalkylene alkyl ether phosphate, a polyoxyalkylene alkyl phenyl ether, polyoxyethylene polyoxypropylene glycol, a glycerin fatty acid ester, a sorbitan fatty acid ester, a polyoxyethylene fatty acid amide, and amine oxide.

Examples of the dispersing agent also include high-molecular-weight dispersing agents having a weight-average molecular weight of 10,000 or more which are produced by copolymerization of hydrophilic and hydrophobic monomers. The weight-average molecular weight can be determined by the same method as described above. The hydrophilic monomer is preferably a dissociative group-containing monomer and is preferably a dissociative group-containing monomer having a dissociative group and an ethylenic unsaturated bond in consideration of dispersion stability. Examples of the dissociative group-containing monomer include a carboxyl group-containing monomer, a sulfonic group-containing monomer, and a phosphate group-containing monomer. The hydrophobic monomer is preferably an aromatic group-containing monomer having an aromatic group and an ethylenic unsaturated bond or an aliphatic hydrocarbon group-containing monomer having an aliphatic hydrocarbon group and an ethylenic unsaturated bond in consideration of dispersion stability. The polymer may be either a random or block copolymer.

The dispersing agent may be a commercial one. Examples of commercial dispersing agents include:

DISPERBYK-101, DISPERBYK-102, DISPERBYK-103, DISPERBYK-106, DISPERBYK-110, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (the above are produced by BYK Chemie); and SOLSPERSE 3000, SOLSPERSE 5000, SOLSPERSE 9000, SOLSPERSE 12000, SOLSPERSE 13240, SOLSPERSE 13940, SOLSPERSE 17000, SOLSPERSE 22000, SOLSPERSE 24000, SOLSPERSE 26000, SOLSPERSE 28000, SOLSPERSE 32000, SOLSPERSE 36000, SOLSPERSE 39000, SOLSPERSE 41000, and SOLSPERSE 71000 (the above are produced by The Lubrizol Corporation).

For dispersing the pigment, publicly known dispersing device can be used. Examples thereof include a ball mill, a sand mill, a bead mill, a roll mill, a jet mill, Paint Shaker, Attritor, an ultrasonic disperser, and Disper.

The ratio of the content of the dispersing agent in the ink relative to the content of the pigment in the ink is preferably 0.05 to 1.0 by mass in consideration of dispersion stability.

Polymerization Initiator

The ink according to an exemplary embodiment of the present disclosure may include at least one polymerization initiator. The polymerization initiator is preferably a radical polymerization initiator that generates radicals.

Examples of the radical polymerization initiator include a light radical polymerization initiator and a thermal radical polymerization initiator. Examples thereof include an alkylphenone compound, an acylphosphine compound, an aromatic onium salt compound, an organic peroxide, a thio compound, a hexaarylbiimidazole compound, a ketoxime ester compound, a borate compound, an azinium compound, a metallocene compound, an active ester compound, a compound having a carbon-halogen bond, and an alkylamine compound.

In particular, the polymerization initiator is preferably at least one selected from the group consisting of an acylphosphine compound and a thio compound and is preferably at least one selected from the group consisting of an acylphosphine oxide compound and a thioxanthone compound.

Examples of the acylphosphine oxide compound include a monoacylphosphine oxide compound and a bisacylphosphine oxide compound.

Examples of the monoacylphosphine oxide compound include isobutyryldiphenylphosphine oxide, 2-ethyl-hexanoyldiphenylphosphine oxide, 2,4,6-trimethylbenzoyl-diphenylphosphine oxide, (2,4,6-trimethylbenzoyl)ethoxy-phenylphosphine oxide, o-toluyldiphenylphosphine oxide, p-t-butylbenzoyldiphenylphosphine oxide, 3-pyridylcarbo-nyldiphenylphosphine oxide, acryloyldiphenylphosphine oxide, benzoyldiphenylphosphine oxide, pivaloylphe-nylphosphinic acid vinyl ester, adipoylbisdiphenylphos-phine oxide, pivaloyldiphenylphosphine oxide, p-toluyldi-phenylphosphine oxide, 4-(t-butyl)benzoyldiphenylphosphine oxide, terephthaloylbisdiphenylphosphine oxide, 2-methylbenzo-yldiphenylphosphine oxide, versatile diphenylphosphine oxide, 2-methyl-2-ethylhexanoyldiphenylphosphine oxide, 1-methyl-cyclohexanoyldiphenylphosphine oxide, piv-aloylphenylphosphinic acid methyl ester, and pivaloylphe-nylphosphinic acid isopropyl ester.

Examples of the bisacylphosphine oxide compound include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-di-chlorobenzoyl)-4-chlorophenylphosphine oxide, bis(2,6-di-chlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis (2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphos-phine oxide, bis(2-chloro-1-naphthoyl)-2,5-dimethylphe-nylphosphine oxide, and bis(2,6-dimethoxybenzoyl)-2,4,4-trimethylpentylphosphine oxide.

Among these, 2,4,6-trimethylbenzoyldiphenylphosphine oxide (e.g., "Omnirad TPO-H" produced by IGM Resins B.V.) and bis(2,4,6-trimethylbenzoyl)phenylphosphine oxide (e.g., "Omnirad 819" produced by IGM Resins B.V.) are preferable as an acylphosphine oxide compound.

Examples of the thioxanthone compound include thioxan-thone, 2-isopropylthioxanthone, 4-isopropylthioxanthone, 2-chlorothioxanthone, 2,4-dichlorothioxanthone, 2-dodecyl-thioxanthone, 2,4-diethylthioxanthone, 2,4-dimethylthi-oxanthone, 1-methoxycarbonylthioxanthone, 2-ethoxycar-bonylthioxanthone, 3-(2-methoxyethoxycarbonyl) thioxanthone, 4-butoxycarbonylthioxanthone, 3-butoxycarbonyl-7-methylthioxanthone, 1-cyano-3-chloro-thioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfuryl-thioxanthone, 3,4-di[2-(2-methoxyethoxy)ethoxycarbonyl] thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholi-nomethylthioxanthone, n-allylthioxanthone-3,4-dicarboxy-imide, n-octylthioxanthone-3,4-dicarboxyimide, N-(1,1,3,3-tetramethylbutyl)thioxanthone-3,4-dicarboxyimide, 1-phenoxythioxanthone, 6-ethoxycarbonyl-2-methoxythio-xanthone, 6-ethoxycarbonyl-2-methylthioxanthone, thio-xanthone-2-polyethylene glycol ester, and 2-hydroxy-3-(3, 4-dimethyl-9-oxo-9H-thioxanthon-2-yloxy)-N,N,N-trimethyl-1-propane aminium chloride.

The thioxanthone compound may be a commercial one. Examples of the commercial product include SPEEDCURE series produced by Lambson, such as SPEEDCURE 7010, SPEEDCURE CPTX, and SPEEDCURE ITX.

The content of the polymerization initiator is preferably 2% by mass or more and is more preferably 5% by mass or more of the total amount of the ink in order to enhance curability. The upper limit for the content of the polymer-ization initiator is, for example, but not limited to, 15% by mass.

Polymerization Inhibitor

The ink according to an exemplary embodiment of the present disclosure preferably includes at least one type of a polymerization inhibitor.

Examples of the polymerization inhibitor include a hyd-roquinone compound, phenothiazine, a catechol, an alkylphenol, an alkylbisphenol, zinc dimethyldithiocarbam-ate, copper dimethyldithiocarbamate, copper dibutyldithio-carbamate, copper salicylate, thiodipropionic acid ester, mercaptobenzimidazole, a phosphite, a nitrosamine com-pound, a hindered amine compound, and nitroxyl radicals.

In particular, the polymerization inhibitor is further pref-erably a nitrosamine compound.

Examples of the nitrosamine compound include an N-ni-troso-N-phenylhydroxylamine aluminum salt and N-ni-troso-N-phenylhydroxylamine. In particular, the nitro-samine compound is preferably an N-nitroso-N-phenylhydroxylamine aluminum salt.

The content of the polymerization inhibitor is preferably 0.05% to 1.0% by mass of the total amount of the ink in order to enhance the temporal stability of the ink.

Additive

The ink according to an exemplary embodiment of the present disclosure may optionally include the following additives as needed: a resin, a cosensitizer, an ultraviolet absorber, an antioxidant, an antifade agent, a conductive salt, a solvent, a basic compound, and the like.

The viscosity of the ink is preferably 0.5 to 50 mPa·s, is more preferably 5 to 40 mPa·s, is preferably 7 to 35 mPa·s, and is further preferably 8 to 30 mPa·s. The above viscosity is measured at 25° C. with a viscometer. Examples of the viscometer that can be used include a viscometer "TV-22" produced by Toki Sangyo Co., Ltd.

The surface tension of the ink is preferably 60 mN/m or less, is more preferably 20 to 50 mN/m, and is further preferably 25 to 45 mN/m. The above surface tension is measured by a Wilhelmy plate method at 25° C. with a surface tensiometer. Examples of the surface tensiometer that can be used include an automatic surface tensiometer "DY-300" produced by Kyowa Interface Science Co., Ltd.

Ink Set

An ink set according to an exemplary embodiment of the present disclosure preferably includes the above-described ink and a pretreatment liquid. The pretreatment liquid is a liquid applied to a substrate before the ink is applied to the substrate. Applying the pretreatment liquid to the substrate before the application of the ink enhances flexibility under repeated folding and bending.

First Aspect

In the first aspect, the pretreatment liquid preferably includes a polymerizable compound and a polyester resin. When the pretreatment liquid includes a polyester resin, adhesiveness to the substrate is increased. This is because the polyester resin reduces the likelihood of a residual stress being generated due to the shrinkage on curing.

Polyester Resin

A polyester resin is a polymer including a backbone having ester linkages. A polyester resin is commonly produced by the reaction of a dicarboxylic acid with a polyol. Examples of the dicarboxylic acid include fumaric acid, itaconic acid, adipic acid, sebacic acid, terephthalic acid, isophthalic acid, sulfoisophthalic acid, naphthalenedicarboxylic acid, tetrahydrophthalic acid, and cyclohexanedicarboxylic acid. Examples of the polyol include ethylene glycol, propylene glycol, glycerin, hexanetriol, butanediol, hexanediol, 1,4-cyclohexanedimethanol, bisphenol A, and hydrogenated bisphenol A.

In particular, the polyester resin is preferably a polyester resin produced by the reaction of a dicarboxylic acid having a ring structure with a polyol having a ring structure. Examples of such a polyester resin include "DIACRON FC1588" produced by Mitsubishi Chemical Corporation, "Nichigo-POLYESTER TP219" produced by Mitsubishi Chemical Corporation, "UVAD081" produced by Osaka Soda Co., Ltd., and "DIACRON ER-535" produced by Mitsubishi Chemical Corporation.

The polyester resins and raw materials for the polyester resins are described in, for example, "Handbook of Polyester Resin" (Eiichiro Takiyama, The Nikkan Kogyo Shimbun, Ltd., Showa 63 (1988)).

Examples of the polyester resin include polyesters, such as polyhydroxybutyrate (PHB), polycaprolactone (PCL), polycaprolactone butylene succinate, polybutylene succinate (PBS), polybutylene succinate adipate (PBSA), polybutylene succinate carbonate, polyethylene terephthalate succinate, polybutylene adipate terephthalate, polytetramethylene adipate terephthalate, polybutylene adipate terephthalate, polyethylene succinate (PES), polyglycolic acid (PGA), and polylactic acid (PLA); carbonate copolymers of aliphatic polyesters; and copolymers of aliphatic polyesters with polyamides.

The weight-average molecular weight of the polyester resin is, for example, 1,500 to 10,000. The above weight-average molecular weight is determined by the same method as described above.

The content of the polyester resin is preferably 0.5% to 15% by mass and is more preferably 1% to 10% by mass of the total amount of the pretreatment liquid.

Polymerizable Compound

The polymerizable compound included in the pretreatment liquid is not limited and may be a monofunctional or multifunctional polymerizable compound. Examples of the monofunctional and multifunctional polymerizable compounds are the same as those of the monofunctional and multifunctional polymerizable compounds that can be included in the above-described ink.

In order to further increase the adhesiveness between the substrate and the image, the proportion of the monofunctional polymerizable compound to the polymerizable compounds included in the pretreatment liquid is preferably 80% by mass or more and is more preferably 90% by mass or more. The upper limit for the above proportion is not set and may be 100% by mass.

In order to reduce odors, the polymerizable compound included in the pretreatment liquid is preferably a monofunctional polymerizable compound including at least one structure selected from the group consisting of a cyclic ether structure and an alicyclic structure, is more preferably a monofunctional polymerizable compound including a cyclic ether structure, and is further preferably a monofunctional (meth)acrylate including a cyclic ether structure.

Examples of the cyclic ether structure include a furan ring structure, a pyran ring structure, an oxirane ring structure, an oxetane ring structure, a dioxane ring structure, a dioxolane ring structure, and a morpholine ring structure.

The number of carbon atoms constituting the ring of the alicyclic structure is not limited and is preferably 5 to 10. Examples of the alicyclic structure include a cyclohexane ring structure, a dicyclopentanyl ring structure, a dicyclopentenyl ring structure, a norbornane ring structure, an isobornane ring structure, a norbornene ring structure, an isobornene ring structure, and an adamantane ring structure.

Examples of the (meth)acrylate including a cyclic ether structure include acryloylmorpholine, cyclic trimethylolpropane formal (meth)acrylate, 1,4-dioxaspiro[4,5]decan-2-yl-methyl (meth)acrylate, tetrahydrofurfuryl (meth)acrylate, and (2-methyl-2-ethyl-1,3-dioxolan-4-yl)methyl (meth)acrylate.

The content of the monofunctional polymerizable compound including at least one structure selected from the group consisting of a cyclic ether structure and an alicyclic structure is preferably 70% to 90% by mass and is more preferably 80% to 85% by mass of the total amount of the pretreatment liquid.

It is also preferable that the pretreatment liquid include a polymerizable silicone-based surfactant as a polymerizable compound. When the pretreatment liquid includes a polymerizable silicone-based surfactant, the bleeding of the image may be reduced. Moreover, the rubfastness of the image may be enhanced.

Examples of the polymerizable silicone-based surfactant are the same as those of the polymerizable silicone-based surfactant that can be included in the above-described ink.

The content of the polymerizable silicone-based surfactant is preferably 3% to 20% by mass and is more preferably 5% to 15% by mass of the total amount of the pretreatment liquid.

The content of the polymerizable compound is preferably 70% to 95% by mass and is more preferably 80% to 90% by mass of the total amount of the pretreatment liquid in consideration of curability.

In the first aspect, the pretreatment liquid may further include a component other than the polymerizable compound or the polyester resin. Examples of the other component include a polymerization initiator, a polymerization inhibitor, and an additive. Examples of the polymerization initiator, the polymerization inhibitor, and the additive are the same as those of the polymerization initiator, the polymerization inhibitor, and the additive that can be included in the above-described ink.

Second Aspect

In the second aspect, the pretreatment liquid preferably includes a polymerizable compound including a polymerizable compound A having an acid group. When the pretreatment liquid includes the polymerizable compound A having an acid group, adhesiveness to the substrate may be increased. This is presumably because the acid group included in the polymerizable compound A interacts with the surface of the substrate.

Examples of the acid group included in the polymerizable compound having an acid group include a carboxyl group, a sulfo group, a phosphonic acid group, a phosphate group, and a sulfonamide group.

Examples of polymerizable compounds having a carboxyl group include 2-(meth)acryloyloxyethylsuccinic acid, 2-(meth)acryloyloxyethylphthalic acid, 2-(meth)acryloyloxyethylhexahydrophthalic acid, 2-(meth)acryloyloxypropylphthalic acid, 2-(meth)acryloyloxypropylhexahydrophthalic acid, 2-carboxyethyl (meth)acrylate, and (meth)acrylic acid.

Examples of polymerizable compounds having a sulfo group include 2-hydroxy-3-sulfopropyl (meth)acrylate, 2-(meth)acrylamide-2-methylpropanesulfonic acid, 2-sulfoethyl (meth)acrylate, 3-sulfopropyl (meth)acrylate, and 4-styrenesulfonic acid.

Examples of polymerizable compounds having a phosphate group include 2-phosphonoxyethyl (meth)acrylate and 2-(meth)acryloyloxyethyl acid phosphate.

Among these, the polymerizable compound A having an acid group is preferably a polymerizable compound having a carboxyl group.

The polymerizable compound A having an acid group may be a monofunctional or multifunctional polymerizable compound having an acid group. In particular, the polymerizable compound A is preferably a monofunctional polymerizable compound having an acid group, is more preferably a monofunctional polymerizable compound having a carboxyl group, and is further preferably a monofunctional (meth)acrylate having a carboxyl group.

The content of the polymerizable compound A having an acid group is preferably 3% to 20% by mass and is more preferably 5% to 15% by mass of the total amount of the ink.

In the second aspect, the pretreatment liquid may further include a polymerizable compound other than the polymerizable compound A having an acid group.

The other polymerizable compound is not limited and may be a monofunctional or multifunctional polymerizable compound. Examples of the monofunctional and multifunctional polymerizable compounds are the same as those of the monofunctional and multifunctional polymerizable compounds that can be included in the above-described ink.

The other polymerizable compound preferably includes a monofunctional polymerizable compound in order to further increase the adhesiveness between the substrate and the image.

In order to reduce odors, the other polymerizable compound included in the pretreatment liquid is preferably a monofunctional polymerizable compound including at least one structure selected from the group consisting of a cyclic ether structure and an alicyclic structure, is more preferably a monofunctional polymerizable compound including a cyclic ether structure, and is further preferably a monofunctional (meth)acrylate including a cyclic ether structure.

The content of the monofunctional polymerizable compound including at least one structure selected from the group consisting of a cyclic ether structure and an alicyclic structure is preferably 65% to 85% by mass and is more preferably 70% to 80% by mass of the total amount of the pretreatment liquid.

It is also preferable that the pretreatment liquid include a polymerizable silicone-based surfactant as another polymerizable compound.

Examples of the polymerizable silicone-based surfactant are the same as those of the polymerizable silicone-based surfactant that can be included in the above-described ink.

The content of the polymerizable silicone-based surfactant is preferably 3% to 20% by mass and is more preferably 5% to 15% by mass of the total amount of the pretreatment liquid.

The content of the polymerizable compound is preferably 70% to 95% by mass and is more preferably 80% to 90% by mass of the total amount of the pretreatment liquid in consideration of curability.

In order to further increase the adhesiveness between the substrate and the image, the proportion of the monofunctional polymerizable compound to the polymerizable compounds included in the pretreatment liquid is preferably 80% by mass or more and is more preferably 90% by mass or more. The upper limit for the above proportion is not set and may be 100% by mass.

In the second aspect, the pretreatment liquid may further include a component other than the polymerizable compound. Examples of the other component include a polymerization initiator, a polymerization inhibitor, and an additive. Examples of the polymerization initiator, the polymerization inhibitor, and the additive are the same as those of the polymerization initiator, the polymerization inhibitor, and the additive that can be included in the above-described ink.

In another aspect, the pretreatment liquid may include both polyester resin and polymerizable compound A having an acid group.

The viscosity of the pretreatment liquid is preferably 0.5 to 50 mPa·s, is more preferably 5 to 40 mPa·s, is preferably 7 to 35 mPa·s, and is further preferably 8 to 30 mPa·s. The above viscosity is measured at 25° C. with a viscometer. Examples of the viscometer that can be used include a viscometer "TV-22" produced by Toki Sangyo Co., Ltd.

The surface tension of the pretreatment liquid is preferably 60 mN/m or less, is more preferably 20 to 50 mN/m, and is further preferably 25 to 45 mN/m. The above surface tension is measured by a Wilhelmy plate method at 25° C. with a surface tensiometer. Examples of the surface tensiometer that can be used include an automatic surface tensiometer "DY-300" produced by Kyowa Interface Science Co., Ltd.

Image Recording Method

An image recording method according to a first exemplary embodiment of the present disclosure preferably includes a step of applying the above-described ink to a substrate by ink jet recording (hereinafter, this step is also referred to as "ink application step" and a step of irradiating the ink with an active energy ray (hereinafter, this step is also referred to as "active energy ray curing step").

Ink Application Step

In the ink application step, the ink is applied to a substrate by ink jet recording.

The type of the substrate is not limited; publicly known substrates can be used. Examples of the substrate include glass, quartz, and a plastic film. Examples of the resin constituting the plastic film include cellulose diacetate, cellulose triacetate, cellulose propionate, cellulose butyrate, cellulose acetate butyrate, cellulose nitrate, an acrylic resin, a chlorinated polyolefin resin, a polyether sulfone resin, polyethylene terephthalate (PET), polyethylene naphthalate, nylon, polyethylene, polystyrene, polypropylene, a polycycloolefin resin, a polyimide resin, a polycarbonate resin, and polyvinyl acetal. The plastic film may be a film that includes only one of the above resins and may be a film composed of a mixture of two or more of the above resins.

Since the ink according to an exemplary embodiment of the present disclosure enables recording of images having excellent flexibility, the ink can be applied to a substrate that is deformable at room temperature. The images having excellent flexibility can follow the deformation of the substrate which occurs at room temperature and, therefore, cracks are unlikely to be formed in the images.

Since the ink can be applied to substrates deformable at room temperature, the substrate is preferably composed of a metal, a plastic, synthetic leather, or a rubber and is more preferably composed of a rubber.

The thickness of the substrate is not limited. Since the ink according to an exemplary embodiment of the present disclosure enables recording of images having excellent flexibility, the ink can be applied to a thick substrate. The lower limit for the thickness of the substrate is, for example, 1 μm. Since the ink can be applied to a thick substrate, the thickness of the substrate is preferably 1 mm or more. The upper limit for the thickness of the substrate is, for example, 5 mm.

The type of ink jet recording is not limit, and any ink jet recording method with which an image can be recorded may be used. Examples of the ink jet recording method include a charge control ink jet method in which an electrostatic attractive force is used for ejecting an ink, a drop-on-demand (pressure pulse) ink jet method in which the vibration pressure of a piezoelectric element is used, an acoustic ink jet method in which an electrical signal is converted into an acoustic beam, an ink is irradiated with the acoustic beam, and the ink is ejected using the resulting radiation pressure, and a thermal ink jet (Bubble Jet (registered trademark)) method in which an ink is heated to form bubbles and the resulting pressure is used.

Examples of the ink jet head used in the ink jet recording method include a shuttle-type ink jet recording method in which a short serial head is used and recording is performed while the head is moved in the width direction of a substrate and a line-type ink jet recording method in which a line head that includes recording elements arranged to cover the entirety of a side of a substrate is used.

In the line-type ink jet recording method, a pattern can be formed over the entire surface of a substrate by scanning the substrate in a direction orthogonal to the direction in which the recording elements are arranged. This eliminates the need to use a transporting system for moving the short head, such as a carriage. In addition, in the line-type ink jet recording method, it becomes not necessary to perform a complex control over the movement of the carriage and the scanning of the substrate. That is, only the substrate is moved. This increases the recording speed compared with the shuttle system.

The amount of droplets of the ink which are ejected from an ink jet head is preferably 1 to 100 pL (picoliter), is more preferably 3 to 80 pL, and is further preferably 3 to 50 pL.

Active Energy Ray Curing Step

In the active energy ray curing step, the ink is irradiated with an active energy ray.

Examples of the active energy ray include a γ-ray, a β-ray, an electron beam, ultraviolet radiation, and visible light. Among these, ultraviolet radiation is preferably used as an active energy ray.

The peak wavelength of ultraviolet radiation is preferably, for example, 200 to 405 nm, is more preferably 250 to 400 nm, and is further preferably 300 to 400 nm. Note that the term "peak wavelength" used herein refers to the wavelength at which the maximum strength occurs in a waveform having the highest intensity in the ultraviolet region (e.g., 200 to 405 nm).

The light sources commonly used for ultraviolet irradiation are a mercury lamp, a gas laser, and a solid-state laser. A mercury lamp, a metal halide lamp, and an ultraviolet fluorescent lamp are broadly known. Compact, long-life, high-efficiency, and low-cost ultraviolet light-emitting diodes (UV-LEDs) and ultraviolet laser diodes (UV-LDs) are considered as promising light sources for ultraviolet irradiation. In particular, the light source for ultraviolet irradiation is preferably a metal halide lamp, a high-pressure mercury lamp, a medium-pressure mercury lamp, a low-pressure mercury lamp, or a UV-LED.

In the present disclosure, polymerizing only a part of the polymerizable compound included in the ink is referred to as "partial curing", and irradiating the ink with an active energy ray to perform partial curing is referred to as "pinning exposure".

In the present disclosure, polymerizing substantially the entirety of the polymerizable compound included in the ink is referred to as "full curing", and irradiating the ink with an active energy ray to perform full curing is referred to as "full exposure".

In the active energy ray irradiation step, it is preferable to partially cure the ink and subsequently fully cure the ink. Specifically, it is preferable to perform the pinning exposure of the ink subsequent to the application of the ink and finally perform the full exposure.

The reaction rate of the ink subsequent to the pinning exposure is preferably 10% to 80%.

Note that the term "reaction rate" of the ink used herein refers to the rate of polymerization of the polymerizable compound included in the ink which is determined by high-performance liquid chromatography.

When the reaction rate of the ink is 10% or more, the droplet settling interference between ink dots can be reduced and, as a result, the quality of the final image may be enhanced.

When the reaction rate of the ink is 80% or less, the possibility of ink dots failing to spread to a sufficient degree is reduced and, consequently, the final image may be improved in terms of graininess.

The reaction rate of the ink is preferably 15% or more in order to further enhance the quality of the final image.

The reaction rate of the ink is preferably 75% or less, is more preferably 50% or less, is preferably 40% or less, is more preferably 30% or less, and is further preferably 25% or less in order to further improve the final image in terms of graininess.

The reaction rate of the ink subsequent to the full exposure is preferably more than 80% and 100% or less, is more preferably 85% to 100%, and is further preferably 90% to 100%.

When the above reaction rate is more than 80%, adhesiveness may be further enhanced.

The reaction rate of the ink is determined by the following method.

A substrate including an ink deposited thereon, the ink having been irradiated with an active energy ray, is prepared. A sample piece having a size of 20 mm×50 mm is taken from a region of the substrate in which the ink film is present (hereinafter, this sample piece is referred to as "irradiated sample piece"). The irradiated sample piece is immersed in 10 mL of tetrahydrofuran (THF) for 24 hours in order to prepare a solution containing an eluted ink. This solution is subjected to high-performance liquid chromatography in order to measure the amount of polymerizable compound (hereinafter, this amount is referred to as "amount of compound X1 after irradiation").

Subsequently, the same operation as described above is performed, except that the ink deposited on a substrate is not irradiated with an active energy ray, and the amount of polymerizable monomer is measured (hereinafter, this amount is referred to as "amount of compound X1 before irradiation").

The ink reaction rate (%) is calculated using the following formula on the basis of the amount of compound X1 after irradiation and the amount of compound X1 before irradiation.

$$\text{Ink reaction rate (\%)}=((\text{Amount of compound } X1 \text{ before irradiation}-\text{Amount of compound } X1 \text{ after irradiation})/\text{Amount of compound } X1 \text{ before irradiation})\times100$$

The amount of exposure of the active energy ray used for the pinning exposure is preferably 10 to 100 mJ/cm$^2$ and is more preferably 20 to 60 mJ/cm$^2$ in order to achieve the above-described ink reaction rate with further ease.

The amount of exposure of the active energy ray used for the full exposure is preferably 50 to 1,000 mJ/cm$^2$ and is more preferably 200 to 800 mJ/cm$^2$ in order to fully cure the ink.

In the full exposure, it is preferable to irradiate the ink with an active energy ray in an atmosphere having an oxygen concentration of less than 1% by volume in order to increase adhesiveness to the substrate. The above oxygen concentration is more preferably 0.5% by volume or less and is further preferably 0.3% by volume or less.

In the active energy ray irradiation step, it is preferable to irradiate the ink with an active energy ray 0.1 to 5 seconds after the ink has landed on the substrate in consideration of image quality. In the case where both pinning exposure and full exposure are performed, it is preferable to irradiate the ink with an active energy ray for pinning exposure 0.1 to 5 seconds after the ink has landed on the substrate. The time interval from when the ink has landed on the substrate to when the ink is irradiated with an active energy ray (in the case where both pinning exposure and full exposure are performed, the active energy ray for pinning exposure) is more preferably 0.2 to 1 second.

An image recording method in which the above-described ink set is used is described below.

In the image recording method according to a second embodiment of the present disclosure, the above-described ink set is used. The image recording method preferably includes a step of applying the pretreatment liquid and the ink to a substrate by ink jet recording and a step of performing irradiation with an active energy ray subsequent to application of the pretreatment liquid and subsequent to application of the ink.

The step of applying the pretreatment liquid and the step of applying the ink are the same as the ink application step described above.

In the active energy ray irradiation step, it is preferable to perform pinning exposure of the pretreatment liquid subsequent to the application of the pretreatment liquid, apply the ink to the partially cured pretreatment liquid, then perform pinning exposure of the ink, and finally perform full exposure.

The preferable aspects of pinning exposure and full exposure are the same as the preferable aspects of pinning exposure and full exposure performed in the active energy ray curing step described above.

EXAMPLES

The present disclosure is described further specifically with reference to Examples below. It should be noted that the present disclosure is not limited by Examples below without departing from the summary of the present disclosure.

Details of each of the components of the inks prepared in Examples and Comparative Examples are as described below.

Monofunctional Polymerizable Compounds

NVC: N-Vinylcaprolactam (produced by BASF SE)

PEA: Phenoxyethyl acrylate ("SR339A", produced by Sartomer)

CHA: Cyclohexyl acrylate ("Viscoat #155, CHA", produced by Osaka Organic Chemical Industry Ltd.)

TMCHA: Trimethylcyclohexyl acrylate ("SR420", produced by Sartomer)

THFA: Tetrahydrofurfuryl acrylate ("SR285", produced by Sartomer)

LA: Lauryl acrylate ("SR335", produced by Sartomer)

CTFA: Cyclic trimethylolpropane formal acrylate ("SR531", produced by Sartomer)

IBOA: Isobornyl acrylate ("SR506", produced by Sartomer)

4-HBA: 4-Hydroxybutyl acrylate ("4-HBA", produced by Osaka Organic Chemical Industry Ltd.)

IOA: Isooctyl acrylate ("SR440", produced by Sartomer)

A-SA: 2-Acryloyloxyethylsuccinic acid ("NK-Ester A-SA", produced by Shin-Nakamura Chemical Co., Ltd.; Polymerizable compound A having an acid group)

Difunctional Polymerizable Compounds

HDDA: 1,6-Hexanediol diacrylate ("Viscoat #230, HDDA", produced by Osaka Organic Chemical Industry Ltd.)

DDDA: 1,10-Decanediol diacrylate ("A-DOD-N", produced by Shin-Nakamura Chemical Co., Ltd.)

PEGDA200: Polyethylene glycol #200 diacrylate ("A-200", produced by Shin-Nakamura Chemical Co., Ltd.)

PEGDA600: Polyethylene glycol #600 diacrylate ("A-600", produced by Shin-Nakamura Chemical Co., Ltd.)

PPGDA700: Polypropylene glycol #700 diacrylate ("APG-700", produced by Shin-Nakamura Chemical Co., Ltd.)

NPGDA: Neopentyl glycol diacrylate ("Lightacrylate NP-A", produced by Kyoeisha Chemical Co., Ltd.)

TCDDMDA: Tricyclodecane dimethanol diacrylate ("EBECRYL 130", produced by Daicel-Allnex Ltd.)

HMPA: 2-Hydroxy-3-methacrylpropyl acrylate ("701A", produced by Shin-Nakamura Chemical Co., Ltd.)

PEGDA1000: Polyethylene glycol #1000 diacrylate ("A-1000", produced by Shin-Nakamura Chemical Co., Ltd.)

Polymerizable Silicone-Based Surfactants

TEGO Rad 2100 (produced by Evonik Industries AG)

TEGO Red 2010 (produced by Evonik Industries AG)

Pigments

White pigment: Titanium dioxide ("KRONOS 2300", produced by Kronos Worldwide, Inc.)

Cyan pigment: Pigment Blue 15:4 ("Heliogen Blue D 7110 F", produced by BASF SE Japan)

Magenta pigment: "Cinquasia Magenta L 4540", produced by BASF SE Japan)

Yellow pigment: Pigment Yellow 155 ("Inkjet Yellow 4GC", produced by Clariant AG)

Black pigment: Carbon black ("Mogul E", produced by Cabot Corporation)

Dispersing Agents

SOLSPERSE 41000 (produced by The Lubrizol Corporation)

SOLSPERSE 32000 (produced by The Lubrizol Corporation)

Efka 7731 (produced by BASF SE Japan)

BYKJET 9151 (produced by BYK)

Polymerization Initiators

Omn.184: 1-Hydroxycyclohexyl-phenyl ketone ("Omnirad 184", produced by IGM Resins B.V.)

Omn.819: Bis(2,4,6-trimethylbenzoyl)phenylphosphine oxide ("Omnirad 819", produced by IGM Resins B.V.)

ITX: Isopropylthioxanthone ("SPEEDCURE ITX", produced by Lambson Ltd.)

TPO: 2,4,6-Trimethylbenzoyldiphenylphosphine oxide ("Omnirad TPO-H", produced by IGM Resins B.V.)

Polymerization Inhibitor

UV12: N-Nitroso-N-phenylhydroxylamine aluminum salt ("FLORSTAB UV12", produced by Kromachem Ltd.)

Additive

BR113: Acrylic resin ("Dianal BR113", produced by Mitsubishi Chemical Corporation)

Preparation of Inks

Example 1

A white pigment dispersion liquid was prepared. Specifically, the following components were charged into a disperser "Motormill M50" produced by Eiger Torrance Ltd. The resulting mixture was subjected to a dispersion treatment for 4 hours at a rotation speed of 9 m/s with zirconia beads having a diameter of 0.65 mm to form a white pigment dispersion liquid.

White pigment . . . 50 parts by mass

Dispersing agent ("SOLSPERSE 41000", produced by The Lubrizol Corporation) . . . 3.53 parts by mass PEA . . . 45.47 parts by mass UV12 . . . 1 part by mass Subsequently, the following components were mixed together. The resulting mixture was stirred for 20 minutes at 25° C. and 5,000 rotations/min using a mixer "L4R" produced by Silverson to form a white ink.

White pigment dispersion liquid . . . 15 parts by mass

PEA . . . 49.6 parts by mass

24

HDDA . . . 1 part by mass

NVC . . . 21.5 parts by mass

BR113 . . . 2.4 parts by mass

UV12 . . . 0.42 parts by mass

Omni.184 . . . 2.8 parts by mass

TPO . . . 8 parts by mass

Examples 2 to 17 and Comparative Examples 1 to 6

Inks were each prepared as in Example 1, except that the contents of the polymerizable compounds in the ink were adjusted to the contents described in Tables 1 to 3. Tables 1 to 3 list the proportions (mass %) of the components relative to the total amount of the polymerizable compound. In Examples 2 to 17 and Comparative Examples 1 to 6, the types and contents of components of the ink which were other than the polymerizable compound were the same as in Example 1.

Image Recording

One of the white inks was charged into the white throttle of an ink jet recording apparatus "Acuity LED 1600R" produced by FUJIFILM Corporation. The substrates used were a synthetic leather sheet "Cappuccino" produced by Yamaplas Co., Ltd. (thickness: 1 mm) and a stainless steel sheet "Stainless Steel Sheet" produced by Yahata Neji Corporation (thickness: 1 mm). The application of the ink was performed under the following conditions: 1,200 dpi× 1,200 dpi, 48 passes, and bidirectional printing. A 100% solid image was recorded. Note that "dpi" is an abbreviation for "dot per inch".

By adjusting the lampworking of the ink jet recording apparatus, the ink deposited on the substrate was irradiated with ultraviolet radiation (peak wavelength: 385 nm) for pinning exposure and ultraviolet radiation (peak wavelength: 385 nm) for full exposure in this order. The amount of exposure for pinning exposure was set to 400 mJ/cm². The amount of exposure for full exposure was set to 1,200 mJ/cm².

Thus, the ink deposited on the substrate was subjected to pinning exposure and full exposure in this order under the above-described conditions. Hereby, an image recorded article was prepared. An image recorded article formed by recording an image on a synthetic leather sheet is referred to as "image recorded article 1", while an image recorded article formed by recording an image on a stainless steel sheet is referred to as "image recorded article 2".

Evaluations

Each of the image recorded articles prepared in Examples and Comparative Examples was evaluated in terms of flexibility, blocking resistance, and adhesiveness. The evaluation methods were as described below.

Flexibility

The image recorded article 1 was bent 180° at room temperature (23° C.). After bending, the image was visually inspected for the occurrence of cracking or detachment of the image.

The image recorded article 2 was bent 90° at room temperature (23° C.) by press forming. After bending, the image was visually inspected for the occurrence of cracking or detachment of the image. After bending, the image was visually inspected for the occurrence of cracking or detachment of the image.

The following evaluation standard was employed.

A: Cracking and detachment did not occur at all.

B: At least one of cracking and detachment occurred slightly.

C: Occurrence of at least one of cracking and detachment was obviously confirmed.

Blocking Resistance

The image recorded articles 1 and 2 were inspected for the stickiness of the surface of the image by hands. The following evaluation standard was employed.

A: Stickiness was not confirmed at all.

B: Slight stickiness was confirmed.

C: Considerable stickiness was confirmed.

Adhesiveness

The image recorded articles 1 and 2 were subjected to a cross hatch test in conformity with ISO 2409 (Cross cut test). In the cross hatch test, cut intervals were set to 1 mm and 25 square lattices with a side of 1 mm were created. The adhesiveness evaluation was conducted on the basis of the proportion (%) of detached lattices. The proportion (%) of detached lattices was calculated using the following formula. In the formula below, the total number of lattices is 25.

$$\text{Proportion of detached lattices (\%)} = [(\text{Number of detached lattices})/(\text{Total number of lattices})] \times 100$$

The following evaluation standard was employed.

A: The proportion (%) of detached lattices was 0%.

B: The proportion (%) of detached lattices was more than 0% and 5% or less.

C: The proportion (%) of detached lattices was more than 5%.

Tables 1 to 3 list the evaluation results.

Tables 1 to 3 list the glass transition temperature (Tg) of a homopolymer formed of each of the monofunctional polymerizable compounds other than the N-vinyl compound. Tables 1 to 3 also list the number of carbon atoms included in each of the difunctional (meth)acrylates excluding the (meth)acryloyl group-portion. The results of evaluations of the image recorded article 1 are described in the column of "Synthetic leather", while the results of evaluations of the image recorded article 2 are described in the column of "Metal".

TABLE 1

| | | Tg(° C.) | Number of carbon atoms | Example 1 | Example 2 | Example 3 | Example 4 | Example 5 | Example 6 | Example 7 |
|---|---|---|---|---|---|---|---|---|---|---|
| Monofunctional polymerizable compound | NVC | — | — | 27.2 | 5.0 | 45 | 27.2 | 27.2 | 27.2 | 27.2 |
| | PEA | 5 | — | 71.5 | 93.7 | 53.7 | — | — | — | — |
| | CHA | 15 | — | — | — | — | 71.5 | — | — | — |
| | TMCHA | 29 | — | — | — | — | — | 71.5 | — | — |
| | THFA | −15 | — | — | — | — | — | — | 71.5 | — |
| | LA | −30 | — | — | — | — | — | — | — | 71.5 |
| Difunctional (meth)acrylate | HDDA | — | 6 | 1.3 | 1.3 | 1.3 | 1.3 | 1.3 | 1.3 | 1.3 |
| Evaluations | Flexibility | Synthetic leather | | A | A | A | A | A | A | A |
| | | Metal | | A | A | A | A | A | A | A |
| | Blocking resistance | Synthetic leather | | A | B | B | A | A | A | A |
| | | Metal | | A | B | B | A | A | A | A |
| | Adhesiveness | Synthetic leather | | A | C | C | B | B | B | B |
| | | Metal | | A | C | C | B | B | B | B |

TABLE 2

| | | Tg (° C.) | Number of carbon atoms | Example 8 | Example 9 | Example 10 | Example 11 | Example 12 | Example 13 | Example 14 | Example 15 | Example 16 | Example 17 |
|---|---|---|---|---|---|---|---|---|---|---|---|---|---|
| Monofunctional polymerizable compound | NVC | — | — | 27.2 | 27.2 | 27.2 | 27.2 | 27.2 | 27.2 | 27.2 | 27.2 | 25.5 | 25.5 |
| | PEA | 5 | — | 71.5 | 71.5 | 71.5 | 71.5 | 71.5 | 71.5 | 71.5 | 71.5 | 73.3 | 73.3 |
| Difunctional (meth)acrylate | DDDA | — | 10 | 1.3 | — | — | — | — | — | — | — | — | — |
| | PEGDA200 | — | 8 | — | 1.3 | — | — | — | — | — | — | — | — |
| | PEGDA600 | — | 28 | — | — | 1.3 | — | — | — | — | — | — | — |
| | PPDA700 | — | 36 | — | — | — | 1.3 | — | — | — | — | — | — |
| | NPGDA | — | 5 | — | — | — | — | 1.3 | — | — | — | — | — |
| | TCDDMDA | — | 12 | — | — | — | — | — | 1.3 | — | — | — | — |
| | HMPA | — | 3 | — | — | — | — | — | — | 1.3 | — | — | — |
| | PEGDA1000 | — | 46 | — | — | — | — | — | — | — | 1.3 | — | — |
| Polymerizable silicone-based surfactant | Tegorad2100 | — | — | — | — | — | — | — | — | — | — | 1.2 | — |
| | Tegorad2010 | — | — | — | — | — | — | — | — | — | — | — | 1.2 |
| Evaluations | Flexibility | Synthetic leather | | A | A | A | A | A | A | B | A | A | A |
| | | Metal | | A | A | A | A | A | A | B | A | A | A |
| | Blocking resistance | Synthetic leather | | A | A | A | A | A | A | A | B | A | A |
| | | Metal | | A | A | A | A | A | A | A | B | A | A |
| | Adhesiveness | Synthetic leather | | B | B | B | B | B | B | A | C | A | A |
| | | Metal | | B | B | B | B | B | B | A | C | A | A |

TABLE 3

| | | Tg(° C.) | Number of carbon atoms | Com-parative Example 1 | Com-parative Example 2 | Com-parative Example 3 | Com-parative Example 4 | Com-parative Example 5 | Com-parative Example 6 |
|---|---|---|---|---|---|---|---|---|---|
| Monofunctional | NVC | — | — | 27.2 | 27.2 | 27.2 | 27.2 | 27.2 | 27.2 |
| polymerizable | PEA | 5 | — | — | — | — | — | 72.8 | 69.8 |
| compound | CTFA | 32 | — | 71.5 | — | — | — | — | — |
| | IBOA | 88 | — | — | 71.5 | — | — | — | — |
| | 4-HBA | −32 | — | — | — | 71.5 | — | — | — |
| | IOA | −54 | — | — | — | — | 71.5 | — | — |
| Difunctional (meth)acrylate | HDDA | — | 6 | 1.3 | 1.3 | 1.3 | 1.3 | — | 3 |
| Evaluations | Flexibility | Synthetic leather | | C | C | A | A | A | C |
| | | Metal | | C | C | A | A | A | C |
| | Blocking resistance | Synthetic leather | | A | A | C | C | C | A |
| | | Metal | | A | A | C | C | C | A |
| | Adhesiveness | Synthetic leather | | B | B | C | C | C | B |
| | | Metal | | B | B | C | C | C | B |

As described in Tables 1 and 2, in Examples 1 to 17, where the ink included a polymerizable compound and a colorant, the polymerizable compound including an N-vinyl compound, a monofunctional polymerizable compound capable of forming a homopolymer having a Tg of −30° C. to 30° C., and a compound selected from the group consisting of a difunctional (meth)acrylate and a polymerizable silicone-based surfactant, wherein the total content of a monofunctional polymerizable compound capable of forming a homopolymer having a Tg of less than −30° C. and a monofunctional polymerizable compound capable of forming a homopolymer having a Tg of more than 30° C. excluding the N-vinyl compound was 10% by mass or less of the total amount of the polymerizable compound, and the total content of the compound selected from the group consisting of the difunctional (meth)acrylate and the polymerizable silicone-based surfactant was 0.1% to 2% by mass of the total amount of the polymerizable compound, images having excellent flexibility and excellent blocking resistance were formed.

In contrast, as described in Table 3, it was confirmed that, in Comparative Examples 1 and 2, where the total content of the monofunctional polymerizable compound capable of forming a homopolymer having a Tg of more than 30° C. was more than 10% by mass, the flexibility of the images was poor.

It was confirmed that, in Comparative Examples 3 and 4, where the total content of the monofunctional polymerizable compound capable of forming a homopolymer having a Tg of less than −30° C. was more than 10% by mass, the blocking resistance of the images was poor.

It was confirmed that, in Comparative Example 5, where the ink did not include the compound selected from the group consisting of a difunctional (meth)acrylate and a polymerizable silicone-based surfactant, the blocking resistance of the images was poor.

It was confirmed that, in Comparative Example 6, where the total content of the compound selected from the group consisting of a difunctional (meth)acrylate and a polymerizable silicone-based surfactant was more than 2% by mass of the total amount of the polymerizable compound, the flexibility of the images was poor.

It was confirmed that, in Example 1, where the content of the N-vinyl compound was 10% to 35% by mass of the total amount of the polymerizable compound and the content of the monofunctional polymerizable compound capable of forming a homopolymer having a glass transition temperature of −30° C. to 30° C. was 60% to 85% by mass of the total amount of the polymerizable compound, blocking resistance was excellent compared with Example 2 or 3.

It was confirmed that, in Example 1, where the ink included phenoxyethyl acrylate, adhesiveness was excellent compared with any of Examples 4 to 7.

It was confirmed that, in Example 1, where the number of carbon atoms included in the difunctional (meth)acrylate excluding the (meth)acryloyl group-portion was 4 or more, flexibility was excellent compared with Example 14. It was also confirmed that, in Example 1, where the number of carbon atoms included in the difunctional (meth)acrylate excluding the (meth)acryloyl group-portion was 36 or less, blocking resistance was excellent compared with Example 15.

Example 101

A cyan pigment dispersion liquid, a magenta pigment dispersion liquid, a yellow pigment dispersion liquid, and a black pigment dispersion liquid were each prepared as in the preparation of the white pigment dispersion liquid, except that the components of the white pigment dispersion liquid were changed to the following components.

Cyan Pigment Dispersion Liquid
  Cyan pigment . . . 30 parts by mass
  PEA . . . 52 parts by mass
  SOLSPERSE 32000 (produced by Noveon) . . . 17 parts by mass
  UV12 . . . 1 part by mass
Magenta Pigment Dispersion Liquid
  Magenta pigment . . . 30 parts by mass
  PEA . . . 56 parts by mass
  SOLSPERSE 32000 . . . 12.5 parts by mass
  UV12 . . . 1.5 parts by mass
Yellow Pigment Dispersion Liquid
  Yellow pigment . . . 33.9 parts by mass
  PEA . . . 58.2 parts by mass
  SOLSPERSE 32000 . . . 6.8 parts by mass
  UV12 . . . 1.1 parts by mass
Black Pigment Dispersion Liquid
  Black pigment . . . 40 parts by mass
  PEA . . . 45.47 parts by mass
  Efka7731 . . . 3.53 parts by mass
  UV12 . . . 1 part by mass A cyan ink, a magenta ink, a yellow ink, and a black ink were each prepared as in the preparation of the white ink, except that the components of the white ink were changed to the following components.

Cyan Ink

Cyan pigment dispersion liquid . . . 8.3 parts by mass

PEA . . . 58.07 parts by mass

HDDA . . . 1 part by mass

NVC . . . 21.7 parts by mass

BR113 . . . 2.98 parts by mass

UV12 . . . 0.35 parts by mass

ITX . . . 1 part by mass

Omni.184 . . . 2.8 parts by mass

Omni.819 . . . 3.8 parts by mass

Magenta Ink

Magenta pigment dispersion liquid . . . 13.5 parts by mass

PEA . . . 55.24 parts by mass

HDDA . . . 1 part by mass

NVC . . . 21.7 parts by mass

BR113 . . . 1.58 parts by mass

UV12 . . . 0.18 parts by mass

BYKJET9151 . . . 0.9 parts by mass

ITX . . . 1 part by mass

Omni.184 . . . 1.4 parts by mass

Omni.819 . . . 3.5 parts by mass

Yellow Ink

Yellow pigment dispersion liquid . . . 7.6 parts by mass

PEA . . . 57.86 parts by mass

HDDA . . . 1 part by mass

NVC . . . 21.7 parts by mass

BR113 . . . 2.7 parts by mass

UV12 . . . 0.34 parts by mass

BYKJET9151 . . . 1 part by mass

ITX . . . 1 part by mass

Omni.184 . . . 2.9 parts by mass

Omni.819 . . . 3.9 parts by mass

Black Ink

Black pigment dispersion liquid . . . 7.6 parts by mass

PEA . . . 58.55 parts by mass

HDDA . . . 1 part by mass

NVC . . . 21.7 parts by mass

BR113 . . . 3 parts by mass

UV12 . . . 0.35 parts by mass

ITX . . . 1 part by mass

Omni.184 . . . 2.9 parts by mass

Omni.819 . . . 3.9 parts by mass

The cyan, magenta, yellow, and black inks prepared above and the white ink prepared in Example 1 were charged into the cyan, magenta, yellow, black, and white throttles of an ink jet recording apparatus "Acuity LED 1600R produced by FUJIFILM Corporation. The substrates used were a synthetic leather sheet "Cappuccino" produced by Yamaplas Co., Ltd. (thickness: 1 mm) and a stainless steel sheet "Stainless Steel Sheet" produced by Yahata Neji Corporation (thickness: 1 mm). The application of the ink was performed under the following conditions: 1,200 dpi×1,200 dpi, 48 passes, and bidirectional printing. A solid image was recorded with the dot percent of the white ink being 100% and the dot percents of the cyan, magenta, yellow, and black inks being 50%.

By adjusting the lampworking of the ink jet recording apparatus, the ink deposited on the substrate was irradiated with ultraviolet radiation (peak wavelength: 385 nm) for pinning exposure and ultraviolet radiation (peak wavelength: 385 nm) for full exposure in this order. The amount of exposure for pinning exposure was set to 400 mJ/cm². The amount of exposure for full exposure was set to 1,200 mJ/cm².

Thus, the white, yellow, magenta, cyan, and black inks were applied to the substrate in this order under the above-described conditions. After each of the inks had been applied to the substrate, pinning exposure was performed. Subsequent to the final pinning exposure, full exposure was performed to form an image recorded article.

In Example 101, evaluations of flexibility, blocking resistance, and adhesiveness were conducted as in Example 1. In either case where the substrate was composed of synthetic leather or a metal, an evaluation grade of "A" was given in terms of flexibility, blocking resistance, and adhesiveness.

Examples 201 and 202

In Example 201, an ink set that included a pretreatment liquid 1 and the white ink prepared in Example 1 was prepared.

In Example 202, an ink set that included a pretreatment liquid 2 and the white ink prepared in Example 1 was prepared.

Preparation of Pretreatment Liquid 1

The following components were mixed together. The resulting mixture was stirred for 20 minutes at 25° C. and 5,000 rotations/min using a mixer "L4R" produced by Silverson to form a pretreatment liquid 1.

CTFA . . . 83 parts by mass

Polyester resin "DIACRON FC-1588" produced by Mitsubishi Chemical Corporation . . . 3 parts by mass Tegorad 2100 . . . 10 parts by mass Omn.819 . . . 3.8 parts by mass UV12 . . . 0.2 parts by mass Preparation of Pretreatment Liquid 2

The following components were mixed together. The resulting mixture was stirred for 20 minutes at 25° C. and 5,000 rotations/min using a mixer "L4R" produced by Silverson to form a pretreatment liquid 2.

CTFA . . . 76 parts by mass

A-SA . . . 10 parts by mass

Tegorad 2100 . . . 10 parts by mass

Omn.819 . . . 3.8 parts by mass

UV12 . . . 0.2 parts by mass

The pretreatment liquid prepared above and the white ink prepared in Example 1 were charged into the clear and white throttles of an ink jet recording apparatus "Acuity LED 1600R produced by FUJIFILM Corporation. In Example 201, the pretreatment liquid 1 was used as a pretreatment liquid, while the pretreatment liquid 2 was used in Example 202. The substrates used were a synthetic leather sheet "Cappuccino" produced by Yamaplas Co., Ltd. (thickness: 1 mm) and a stainless steel sheet "Stainless Steel Sheet" produced by Yahata Neji Corporation (thickness: 1 mm). The application of the ink was performed under the following conditions: 1,200 dpi×1,200 dpi, 48 passes, and bidirectional printing. A 100% solid image was recorded.

By adjusting the lampworking of the ink jet recording apparatus, the ink deposited on the substrate was irradiated with ultraviolet radiation (peak wavelength: 385 nm) for pinning exposure and ultraviolet radiation (peak wavelength: 385 nm) for full exposure in this order. The amount of exposure for pinning exposure was set to 400 mJ/cm². The amount of exposure for full exposure was set to 1,200 mJ/cm².

Thus, the pretreatment liquid and white ink were applied to the substrate in this order under the above-described conditions. After each of the pretreatment liquid and the white ink had been applied to the substrate, pinning exposure was performed. Subsequent to the final pinning exposure, full exposure was performed to form an image recorded article.

In Examples 201 and 202, evaluations of flexibility, blocking resistance, and adhesiveness were conducted as in Example 1. In either case where the substrate was composed of synthetic leather or a metal, an evaluation grade of "A" was given in terms of flexibility, blocking resistance, and adhesiveness.

The image recorded articles that included a substrate composed of synthetic leather were further subjected to repeated bending and evaluated in terms of flexibility. The evaluation method used is as described below.

Flexibility Under Repeated Bending

The image recorded articles that included a substrate composed of synthetic leather were bent 180° at room temperature (23° C.) and unbent. The above operation was repeated 100 times and, subsequently, the image was visually inspected for the occurrence of cracking or detachment of the image.

In both Examples 201 and 202, cracking and detachment did not occur at all in the evaluation of flexibility under repeated bending.

Japanese Patent Application No. 2021-135103 filed on Aug. 20, 2021, is incorporated herein by reference in its entirety. All documents, patent applications, and technical standards referred to herein are incorporated herein by reference in their entirety to the same extent as when the individual documents, patent applications, and technical standards are specifically and individually indicated to be incorporated by reference in its entirety.

What is claimed is:

1. An active energy ray-curable ink, comprising:
a polymerizable compound; and
a colorant,
the polymerizable compound comprising:
an N-vinyl compound,
a monofunctional polymerizable compound capable of forming a homopolymer having a glass transition temperature of –30° C. to 30° C., and
a compound selected from the group consisting of a difunctional (meth)acrylate and a polymerizable silicone-based surfactant,
wherein a content of the N-vinyl compound is from 10% to 35% by mass of the total amount of the polymerizable compound,
wherein a content of the monofunctional polymerizable compound capable of forming a homopolymer having a glass transition temperature of –30° C. to 30° C. is from 60% to 85% by mass of the total amount of the polymerizable compound,
wherein a total content of a monofunctional polymerizable compound capable of forming a homopolymer having a glass transition temperature of less than –30° C. and a monofunctional polymerizable compound capable of forming a homopolymer having a glass transition temperature of more than 30° C., excluding the N-vinyl compound, is 10% by mass or less of a total amount of the polymerizable compound, and
wherein a total content of the compound selected from the group consisting of the difunctional (meth)acrylate and the polymerizable silicone-based surfactant is 0.1% 0.5% to 2% by mass of the total amount of the polymerizable compound.

2. The active energy ray-curable ink according to claim 1, wherein the N-vinyl compound comprises N-vinylcaprolactam.

3. The active energy ray-curable ink according to claim 1, wherein the monofunctional polymerizable compound capable of forming a homopolymer having a glass transition temperature of –30° C. to 30° C. comprises phenoxyethyl acrylate.

4. The active energy ray-curable ink according to claim 1, wherein the number of carbon atoms included in the difunctional (meth)acrylate, excluding a (meth)acryloyl group-portion, is 4 to 36.

5. The active energy ray-curable ink according to claim 1, wherein the polymerizable compound comprises the polymerizable silicone-based surfactant.

6. An ink set, comprising:
the active energy ray-curable ink according to claim 1; and
a pretreatment liquid.

7. The ink set according to claim 6, wherein the pretreatment liquid comprises a polymerizable compound and a polyester resin.

8. The ink set according to claim 6, wherein the pretreatment liquid comprises a polymerizable compound including a polymerizable compound A having an acid group.

9. The ink set according to claim 7, wherein a proportion of a monofunctional polymerizable compound to the polymerizable compound included in the pretreatment liquid is 80% by mass or more.

10. An image recording method, comprising:
applying the active energy ray-curable ink according to claim 1 to a substrate; and
irradiating the active energy ray-curable ink deposited on the substrate with an active energy ray.

11. The image recording method according to claim 10, wherein the substrate has a thickness of 1 mm or more.

12. The image recording method according to claim 10, wherein the substrate is composed of a metal, a plastic, a synthetic leather, or a rubber.

13. An image recording method, comprising:
using the ink set according to claim 6;
applying the pretreatment liquid and the ink to a substrate by ink jet recording; and
performing irradiation with an active energy ray subsequent to application of the pretreatment liquid and subsequent to application of the ink.

14. The active energy ray-curable ink according to claim 1, wherein the total content of the compound selected from the group consisting of the difunctional (meth)acrylate and the polymerizable silicone-based surfactant is 0.5% to 1.5% by mass of the total amount of the polymerizable compound.

15. The active energy ray-curable ink according to claim 1, wherein the difunctional (meth)acrylate is selected from the group consisting of 1,6-hexanediol diacrylate, 1,10-decanediol diacrylate, neopentyl glycol diacrylate, tricyclodecane dimethanol diacrylate, and 2-hydroxy-3-methacrylpropyl acrylate.

* * * * *